(12) United States Patent
Takahara et al.

(10) Patent No.: US 11,752,999 B2
(45) Date of Patent: Sep. 12, 2023

(54) VEHICLE CONTROL APPARATUS

(71) Applicant: MAZDA MOTOR CORPORATION, Hiroshima (JP)

(72) Inventors: Yasunori Takahara, Hiroshima (JP); Kazunori Tsumura, Hiroshima (JP); Daisuke Umetsu, Hiroshima (JP); Hirofumi Fujishita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 455 days.

(21) Appl. No.: 16/981,981

(22) PCT Filed: Mar. 15, 2019

(86) PCT No.: PCT/JP2019/010908
§ 371 (c)(1),
(2) Date: Sep. 17, 2020

(87) PCT Pub. No.: WO2019/188437
PCT Pub. Date: Oct. 3, 2019

(65) Prior Publication Data
US 2021/0146914 A1  May 20, 2021

(30) Foreign Application Priority Data

Mar. 28, 2018 (JP) .................. 2018-061246

(51) Int. Cl.
*B60T 8/1755* (2006.01)
*B60W 10/184* (2012.01)
(Continued)

(52) U.S. Cl.
CPC ....... *B60W 30/045* (2013.01); *B60T 8/17551* (2013.01); *B60T 8/17554* (2013.01);
(Continued)

(58) Field of Classification Search
CPC .... B60W 10/188; B60W 10/04; B60W 10/06; B60W 10/184; B60W 40/114;
(Continued)

(56) References Cited

U.S. PATENT DOCUMENTS

2002/0087247 A1\* 7/2002 Tanaka ................. B60T 8/1755
701/41
2006/0169522 A1\* 8/2006 Katayama ............ B60W 40/112
180/421

(Continued)

FOREIGN PATENT DOCUMENTS

JP 5143103 B2 2/2013
JP 2014-166014 A 9/2014

OTHER PUBLICATIONS

International Preliminary Report on Patentability and Written Opinion issued in PCT/JP2019/010908; dated Sep. 29, 2020.

(Continued)

*Primary Examiner* — Stephen Holwerda
(74) *Attorney, Agent, or Firm* — Studebaker & Brackett PC

(57) ABSTRACT

A vehicle control apparatus has a steering wheel 6, an engine 4 for outputting a driving force of a vehicle 1, a brake apparatus 16 capable of applying different braking forces to left and right wheels, and a PCM 14 including a processor and the like. When executing vehicle yaw control, which controls the brake apparatus 16 to apply to the vehicle 1 a yaw moment in the direction opposite to the yaw rate generated in the vehicle 1, after executing vehicle attitude control for reducing an output torque of the engine 4 based on a turning operation of the steering wheel 6, when the control amount of the vehicle attitude control is large, the (Continued)

PCM 14 increases the control amount of the vehicle yaw control compared to when the control amount of the vehicle attitude control is not large.

20 Claims, 5 Drawing Sheets

(51) Int. Cl.
*B60W 30/045* (2012.01)
*B60W 40/114* (2012.01)
*B60W 40/13* (2012.01)

(52) U.S. Cl.
CPC ........ *B60W 10/184* (2013.01); *B60W 40/114* (2013.01); *B60W 2040/1346* (2013.01); *B60W 2520/14* (2013.01); *B60W 2540/18* (2013.01)

(58) Field of Classification Search
CPC ............... B60W 10/18; B60W 30/045; B60W 2720/30; B60W 2540/18; B60W 2720/14; B60W 2720/406; B60W 2520/14; B60W 2040/1346; B60T 8/17555; B60T 8/17554; B60T 8/17551; B60T 2201/16; B60T 2220/03
See application file for complete search history.

(56) References Cited

U.S. PATENT DOCUMENTS

| | | | |
|---|---|---|---|
| 2008/0183353 A1* | 7/2008 | Post | B60W 10/184 701/84 |
| 2010/0204887 A1* | 8/2010 | Ichinose | B60L 15/2036 701/41 |
| 2011/0307129 A1* | 12/2011 | Yu | B60W 30/02 701/22 |
| 2012/0179349 A1* | 7/2012 | Yamakado | B60W 30/045 701/89 |
| 2012/0316745 A1* | 12/2012 | Futamura | B60T 8/1755 701/72 |
| 2014/0222309 A1 | 8/2014 | Yamakado et al. | |

OTHER PUBLICATIONS

International Search Report issued in PCT/JP2019/010908; dated Jun. 11, 2019.

\* cited by examiner

VEHICLE CONTROL APPARATUS

TECHNICAL FIELD

The present invention relates to a vehicle control apparatus, and particularly relates to a vehicle control apparatus having a brake apparatus capable of applying different braking forces to left and right wheels.

BACKGROUND ART

Conventionally, there has been known a system (electronic stability control or the like) that controls the behavior of a vehicle to a safe direction when the behavior of the vehicle becomes unstable due to a slip or the like. Specifically, there has been known a device that detects an occurrence of understeering or oversteering behavior of the vehicle when the vehicle is cornering, and applies an appropriate deceleration to the wheels to restrict the behavior.

On the other hand, unlike the above-mentioned control for improving the safety in the traveling state in which the behavior of the vehicle becomes unstable, there has been known a vehicle motion control apparatus that adjusts the deceleration during cornering to adjust the load applied to the front wheels, which are steered wheels, so that a series of operations (such as braking, turning of steering, acceleration, and returning of steering) performed by a driver when the vehicle is cornering in a normal traveling state are natural and stable.

Moreover, there has been proposed a vehicle behavior control apparatus that, when the driver starts a steering operation, quickly produces a deceleration on the vehicle by reducing the torque generated by an engine or a motor, according to a yaw rate related amount (for example, a yaw acceleration) corresponding to the steering operation performed by the driver, and thereby quickly applies a sufficient load to the front wheels as steered wheels (see, for example, Patent Literature 1). According to this device, by quickly applying the load to the front wheels when the driver starts a steering operation, the frictional force between the front wheels and the road surface is increased and the cornering force of the front wheels is increased, and therefore the turn-in ability of the vehicle in an early stage of entering the curve is improved, and the responsiveness to the steering turning operation (namely, steering stability) is improved. Thus, it is possible to realize control of vehicle attitude according to an intention of the driver. Hereinafter, such control will be referred to as the "vehicle attitude control" as appropriate.

Furthermore, unlike the above-mentioned control for improving the safety in the traveling state in which the behavior of the vehicle is unstable, there has been known a vehicle motion control apparatus that reduces skidding in a marginal operating region by automatically performing acceleration and deceleration linked to a handling operation operated from a routine operating region (see, for example, Patent Literature 2). In particular, Patent Literature 2 discloses a vehicle motion control apparatus having a first mode in which acceleration and deceleration in the front-rear direction of a vehicle is controlled, and a second mode in which the yaw moment of the vehicle is controlled.

CITATION LIST

Patent Literatures

Patent Literature 1: Japanese Patent Application Publication No. 2014-166014
Patent Literature 2: Japanese Patent No. 5143103

SUMMARY OF INVENTION

Technical Problem

As described above, in the technique disclosed in Patent Literature 2, in the second mode, the yaw moment is applied to the vehicle. This control for applying the yaw moment to the vehicle is typically executed when returning the steering wheel (hereinafter is also simply denoted as "steering"). Specifically, when the returning operation of steering is performed, in order to restrict the turning of the vehicle, in other words, to promote the returning of the vehicle to the straight traveling direction, the brake apparatus applies a braking force to the turning outer wheel so that a yaw moment in the direction opposite to the yaw rate generated in the vehicle is applied. Hereinafter, such control for applying a yaw moment to the vehicle will be referred to as the "vehicle yaw control" as appropriate.

It is conceived to combine this vehicle yaw control and the vehicle attitude control as disclosed in Patent Literature 1 so that the vehicle attitude control is executed when the driver starts a steering turning operation, and thereafter the vehicle yaw control is executed when a steering returning operation is performed. At this time, if the balance between the control amount of the vehicle attitude control and the control amount of the vehicle yaw control is not appropriate, the driver may feel discomfort as if control interventions are inconsistent.

The present invention has been made to solve the above-mentioned problems of the prior art, and an object of the present invention is to appropriately reduce the sense of discomfort felt by the driver due to the control with a vehicle control apparatus, which executes vehicle yaw control for applying a yaw moment to the vehicle, by executing the vehicle yaw control while considering vehicle attitude control that reduces a driving force of the vehicle based on a turning operation of a steering apparatus (steering).

Solution to Problem

In order to achieve the object, the present invention is a vehicle control apparatus having a steering apparatus, a driving force control mechanism for controlling a driving force of a vehicle, a brake apparatus capable of applying different braking forces to left and right wheels, and a controller, and is characterized in that the controller is configured to execute vehicle attitude control for controlling the driving force control mechanism to reduce the driving force of the vehicle, based on a turning operation of the steering apparatus, execute vehicle yaw control for controlling the brake apparatus to apply to the vehicle a yaw moment in a direction opposite to a yaw rate generated in the vehicle, based on a returning operation of the steering apparatus, and, when a control amount of the vehicle attitude control is large at time of execution of the vehicle yaw control after executing the vehicle attitude control, increase a control amount of the vehicle yaw control compared to when the control amount of the vehicle attitude control is not large.

According to the present invention thus configured, when the control amount of the vehicle attitude control is large at time of execution of the vehicle yaw control after executing the vehicle attitude control, the controller increases the control amount of the vehicle yaw control compared to when the control amount of the vehicle attitude control is not large.

When the vehicle attitude control amount is relatively large, the moment for turning the vehicle in the direction corresponding to the turning operation of the steering apparatus tends to be stronger. Therefore, if the control amount of the vehicle yaw control is constant regardless of the vehicle attitude control amount during a returning operation subsequent to the turning operation, the yaw moment applied in the direction corresponding to the returning operation of the steering apparatus is insufficient. According to the present invention, as described above, when the control amount of the vehicle attitude control is large, the control amount of the vehicle yaw control is increased compared to when the control amount of the vehicle attitude control is not large, and therefore it is possible to prevent the insufficient yaw moment from being applied to the vehicle by the vehicle yaw control during the returning operation subsequent to the turning operation. Consequently, it is possible to achieve an appropriate balance between the control amount of the vehicle attitude control and the control amount of the vehicle yaw control, and it is possible to prevent the driver from feeling a sense of discomfort as if there is inconsistency in control interventions in the vehicle attitude control and vehicle yaw control executed successively when the vehicle is turning.

In the present invention, preferably, the control amount of the vehicle attitude control includes at least any one of a deceleration that is applied to the vehicle by a reduction of the driving force of the vehicle, a reduction amount of the driving force of the vehicle, a reducing speed of the driving force of the vehicle, and the sum of reduction amounts of driving force of the vehicle.

According to the present invention thus configured, the control amount of the vehicle attitude control can be appropriately taken into consideration.

In the present invention, preferably, the controller is configured to, when the control amount of the vehicle attitude control is large in a case where the time from an end of the vehicle attitude control to a start of the vehicle yaw control is equal to or less than a predetermined time, increase the control amount of the vehicle yaw control compared to when the control amount of the vehicle attitude control is not large.

According to the present invention thus configured, when the time from the end of the vehicle attitude control to the start of the vehicle yaw control is equal to or less than the predetermined time and the vehicle yaw control executed in a situation in which the influence of the vehicle attitude control remains, the control amount of the vehicle yaw control is adjusted while considering the influence of the vehicle attitude control, thereby appropriately reducing the sense of discomfort felt by the driver due to the control.

In the present invention, preferably, the controller is configured to execute the vehicle yaw control when a value corresponding to a returning operation of the steering apparatus reaches or exceeds a predetermined threshold value, and, when the control amount of the vehicle attitude control is large at time of execution of the vehicle yaw control after executing the vehicle attitude control, decrease the threshold value compared to when the control amount of the vehicle attitude control is not large.

According to the present invention thus configured, when the control amount of the vehicle attitude control is large, the threshold value for determining whether or not to execute the vehicle yaw control is decreased, and therefore the sense of discomfort felt by the driver can be appropriately reduced by not executing the vehicle yaw control after executing the vehicle attitude control.

Moreover, in the present invention, preferably, the controller is configured to, when the steering speed of the steering apparatus reaches or exceeds a predetermined threshold value, set a yaw moment based on a target lateral jerk corresponding to the steering speed and the vehicle speed, and execute the vehicle yaw control to apply the yaw moment to the vehicle.

According to the present invention thus configured, the yaw moment of magnitude corresponding to the speed of a steering operation performed by the driver can be applied in the direction of restricting the turning of the vehicle, and the vehicle behavior can be quickly stabilized in response to the steering operation performed by the driver.

Further, in the present invention, preferably, the controller is configured to, when the changing speed of the difference between a target yaw rate corresponding to the steering angle of the steering apparatus and the vehicle speed and an actual yaw rate actually generated in the vehicle reaches or exceeds a predetermined threshold value, set a yaw moment based on the changing speed, and execute the vehicle yaw control to apply the yaw moment to the vehicle.

According to the present invention thus configured, for example, when the steering wheel is operated on a low μ road such as a compressed snow road, a yaw moment in the direction of restricting the turning can be immediately applied to the vehicle in response to a sudden change in the yaw rate difference caused by a delay in the response of the actual yaw moment, and the vehicle behavior can be quickly stabilized in response to the steering operation performed by the driver before the behavior of the vehicle becomes unstable.

In another aspect, in order to achieve the above-mentioned object, the present invention is a vehicle control apparatus having a steering apparatus, a driving force control mechanism for controlling a driving force of a vehicle, a brake apparatus capable of applying different braking forces to left and right wheels, and a controller, and is characterized in that the controller is configured to: execute vehicle attitude control for controlling the driving force control mechanism to reduce the driving force of the vehicle, based on a turning operation of the steering apparatus; when a value corresponding to a returning operation of the steering apparatus reaches or exceeds a predetermined threshold value, execute vehicle yaw control for controlling the brake apparatus to apply to the vehicle a yaw moment in a direction opposite to a yaw rate generated in the vehicle, based on the returning operation of the steering apparatus; and, when the control amount of the vehicle attitude control is large at time of execution of the vehicle yaw control after executing the vehicle attitude control, decrease the threshold value compared to when the control amount of the vehicle attitude control is not large.

According to the present invention thus configured, when the control amount of the vehicle attitude control is large at time of execution of the vehicle yaw control after executing the vehicle attitude control, the controller decreases a threshold value for determining whether or not to execute the vehicle yaw control, compared to when the control amount of the vehicle attitude control is not large, and therefore, by not executing the vehicle yaw control after executing the vehicle attitude control, it is possible to appropriately reduce the sense of discomfort felt by the driver.

Effects of Invention

According to the present invention, in the vehicle control apparatus that performs the vehicle yaw control for applying a yaw moment to the vehicle, the vehicle yaw control is executed while considering the vehicle attitude control that reduces the driving force of the vehicle based on a turning operation of the steering apparatus (steering), and therefore it is possible to appropriately reduce the sense of discomfort felt by the driver due to the control.

DESCRIPTION OF EMBODIMENT

Hereinafter, a vehicle control apparatus according to an embodiment of the present invention will be described with reference to the attached drawings.

<System Configuration>

Figure 1:
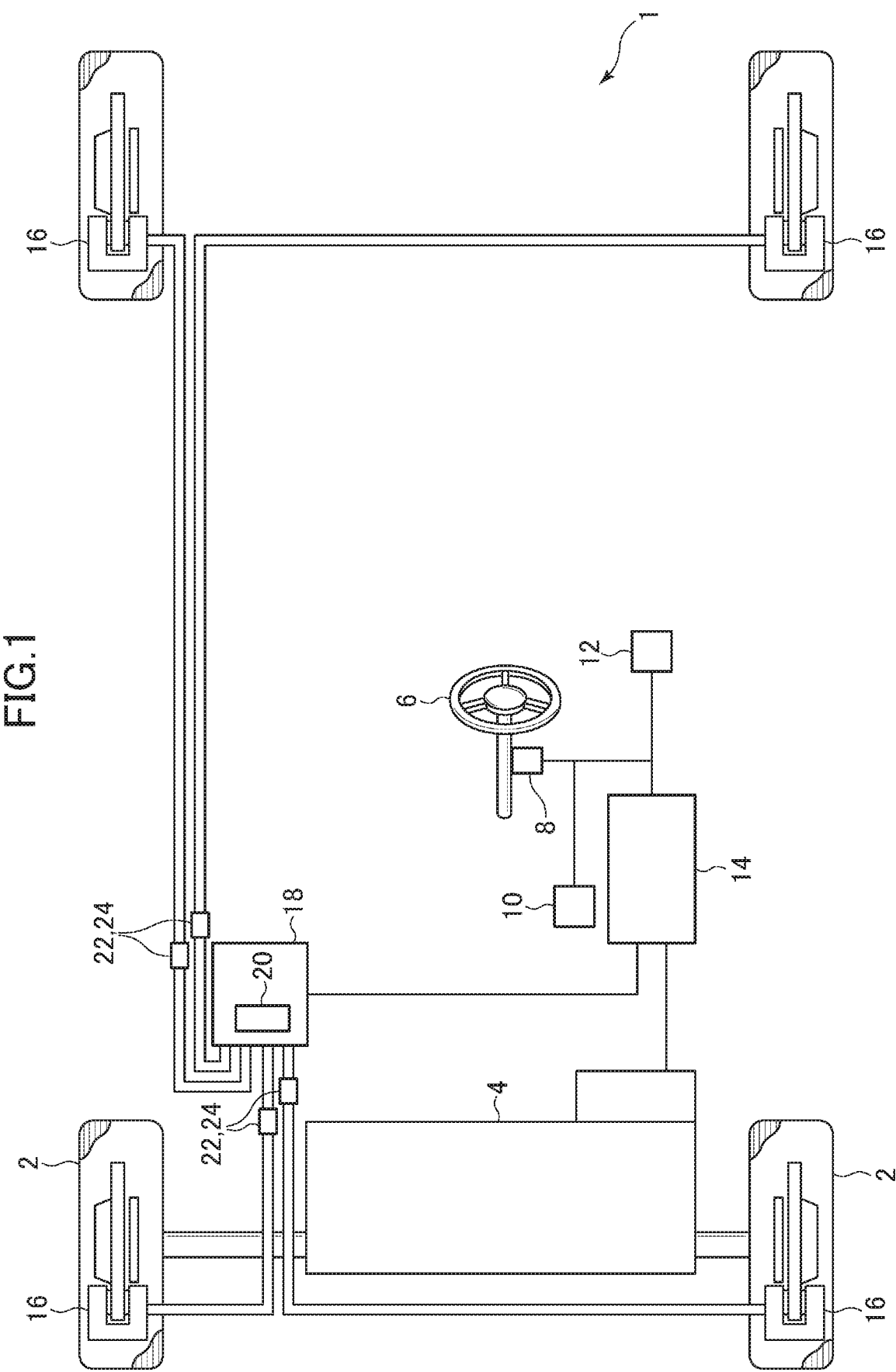
FIG. 1 is a block diagram showing the entire configuration of a vehicle equipped with a vehicle control apparatus according to an embodiment of the present invention.

First, a system configuration of a vehicle equipped with the vehicle control apparatus according to the embodiment of the present invention will be explained using FIG. 1. FIG. 1 is a block diagram showing the entire configuration of the vehicle equipped with the vehicle control apparatus according to the embodiment of the present invention.

In FIG. 1, reference sign 1 represents the vehicle equipped with the vehicle control apparatus according to the embodiment. In a vehicle body front portion of the vehicle 1, an engine 4 is mounted as a drive source for driving drive wheels (left and right front wheels 2 in the example of FIG. 1). The engine 4 is an internal combustion engine such as a gasoline engine or a diesel engine, and, in the present embodiment, is a gasoline engine having a spark plug.

The vehicle 1 has mainly a steering apparatus (such as a steering wheel 6) for steering the vehicle 1, a steering angle sensor 8 for detecting a steering angle as a rotation angle of a steering column (not shown) connected to the steering wheel 6 of the steering apparatus, a vehicle speed sensor 10 for detecting a vehicle speed, and a yaw rate sensor 12 for detecting a yaw rate. Each of these sensors outputs a detected value to a PCM (Power-train Control Module) 14.

The vehicle 1 is also provided with a brake control system 18 for supplying a brake fluid pressure to a wheel cylinder and a brake caliper of a brake apparatus 16 mounted on each wheel. The brake control system 18 has a hydraulic pump 20 that generates a brake fluid pressure required for generating a braking force in the brake apparatus 16 mounted on each wheel. The hydraulic pump 20 is driven by electric power supplied from a battery, for example, and is capable of generating the brake fluid pressure required for generating the braking force in each brake apparatus 16 even when a brake pedal is not pressed. The brake control system 18 also has valve units 22 (specifically, solenoid valves) for controlling the fluid pressure supplied to the brake apparatuses 16 for the wheels from the hydraulic pump 20, the valve units 22 being provided in fluid pressure supply lines to the brake apparatuses 16 for the wheels. For example, the opening of each valve unit 22 is modified by adjusting the electric power supply amount from the battery to the valve unit 22. The brake control system 18 is also provided with fluid pressure sensors 24 for detecting the fluid pressure supplied from the hydraulic pump 20 to the brake apparatuses 16 for the wheels. Each fluid pressure sensor 24 is disposed, for example, in a connection portion between each valve unit 22 and a fluid pressure supply line on the downstream side, detects the fluid pressure on the downstream side of each valve unit 22, and outputs a detected value to the PCM (Power-train Control Module) 14.

The brake control system 18 calculates the fluid pressure, which is independently supplied to the wheel cylinder and brake caliper of each wheel, based on a braking force command value input from the PCM 14 and the detected value from the fluid pressure sensor 24, and controls the rotation speed of the hydraulic pump 20 and the opening of each valve unit 22 according to the fluid pressure.

Figure 2:
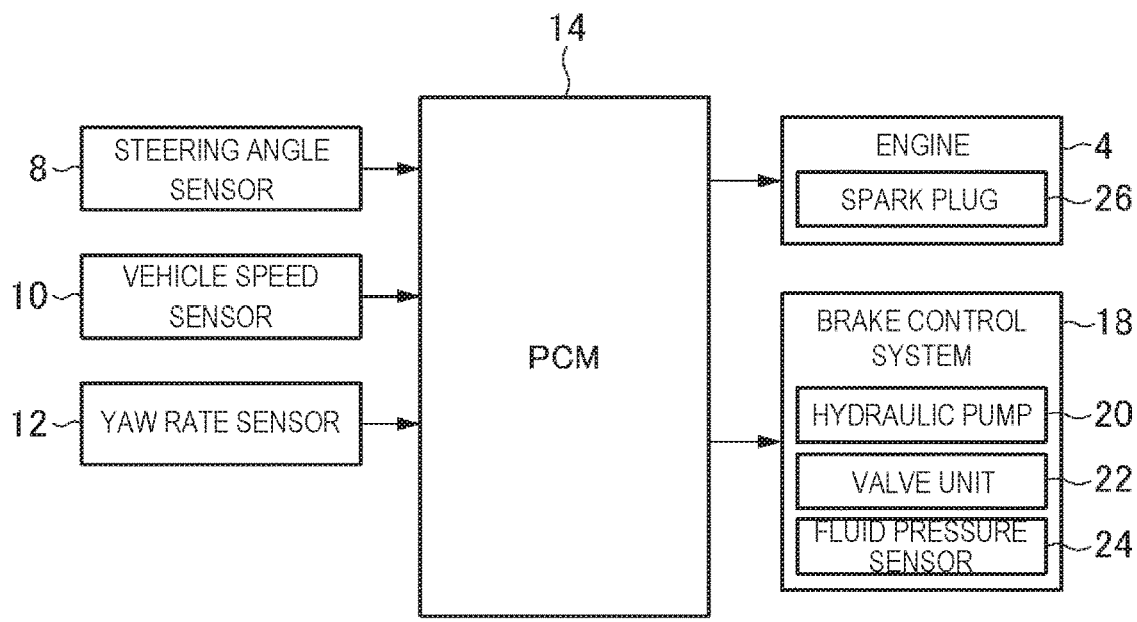
FIG. 2 is a block diagram showing the electrical configuration of the vehicle control apparatus according to the embodiment of the present invention.

Next, the electrical configuration of the vehicle control apparatus according to the embodiment of the present invention will be explained using FIG. 2. FIG. 2 is a block diagram showing the electrical configuration of the vehicle control apparatus according to the embodiment of the present invention.

The PCM 14 of the present embodiment outputs control signals for controlling parts of the engine 4 functioning as a driving force control mechanism (typically a spark plug 26, and others such a throttle valve, a turbosupercharger, a variable valve mechanism, a fuel injection valve, and an EGR device) and the brake control system 18, based on detection signals from the sensors 8, 10, 12, 24 and detection signals output from various sensors that detect the operational state of the engine 4.

Each of the PCM 14 and the brake control system 18 is constituted by a computer having at least one processor, various programs (including basic control programs such as an OS and application programs which are activated on the OS to realize specific functions) which are interpreted and executed on the processor, and internal memory such as ROM and RAM that store the programs and various data. Although details will be described later, the PCM 14 and the brake control system 18 correspond to a "controller" of the present invention.

<Vehicle Control>

Figure 3:
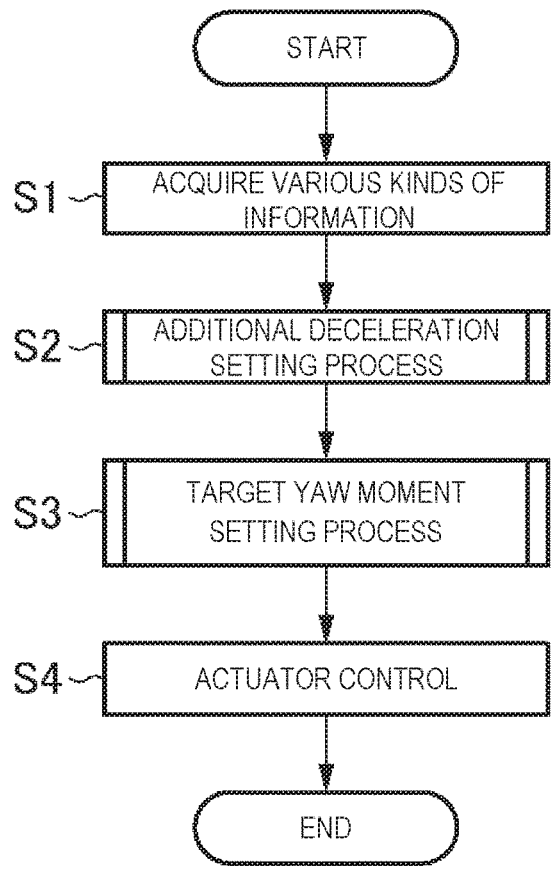
FIG. 3 is a flowchart of a vehicle control process according to the embodiment of the present invention.

Next, the specific contents of control that is executed by the vehicle control apparatus will be explained. First, the overall flow of a vehicle control process that is performed by the vehicle control apparatus of the embodiment of the present invention will be explained using FIG. 3. FIG. 3, is a flowchart of the vehicle control process according to the embodiment of the present invention.

When an ignition of the vehicle 1 is turned on and power is supplied to the PCM 14 and the like, the vehicle control process of FIG. 3 is activated and repeatedly executed at a predetermined cycle (for example, 50 ms).

When the vehicle control process is started, as shown in FIG. 3, the PCM 14 acquires various kinds of information on the vehicle 1 in step S1. Specifically, the PCM 14 acquires detection signals output by various sensors of the vehicle 1, including the steering angle detected by the steering angle sensor 8, the vehicle speed detected by the vehicle speed sensor 10, and the yaw rate detected by the yaw rate sensor 12.

Next, in step S2, the PCM 14 executes an additional deceleration setting process and sets an additional deceleration to be applied to the vehicle 1.

Subsequently, in step S3, the PCM 14 executes a target yaw moment setting process and sets a target yaw moment to be applied to the vehicle 1.

Next, in step S4, the PCM 14 controls the engine 4 to apply the additional deceleration set in step S2 to the vehicle 1 (vehicle attitude control). In this case, the PCM 14 reduces output torque of the engine 4 to apply the set additional deceleration to the vehicle 1. Typically, the PCM 14 reduces the output torque of the engine 4 by controlling the spark plug 26 to retard the ignition timing of the engine 4.

In step S4, the brake control system 18 controls each brake apparatus 16 to apply the target yaw moment set in step S3 to the vehicle 1 (vehicle yaw control). The brake control system 18 stores, in advance, a map defining the relationship between the yaw moment command value and the rotation speed of the hydraulic pump 20, and operates the hydraulic pump 20 at a rotation speed corresponding to the yaw moment command value set in the target yaw moment setting process of step S3 (for example, raises the rotation speed of the hydraulic pump 20 to a rotation speed corresponding to a braking force command value by increasing the electric power supplied to the hydraulic pump 20) with reference to the map.

The brake control system 18 also stores, in advance, a map defining the relationship between the yaw moment command value and the opening of each valve unit 22, for example, controls each of the valve units 22 individually to have an opening corresponding to the yaw moment command value (for example, increases the opening of the solenoid valve to the opening corresponding to the braking force command value by increasing the electric power supplied to the solenoid valve) with reference to the map, and thereby adjusts the braking forces to each wheel. The brake control system 18 does not perform the control of step S4 when a target yaw moment is not set in step S3.

After step S4 described above, the PCM 14 ends the vehicle control process.

Figure 4:
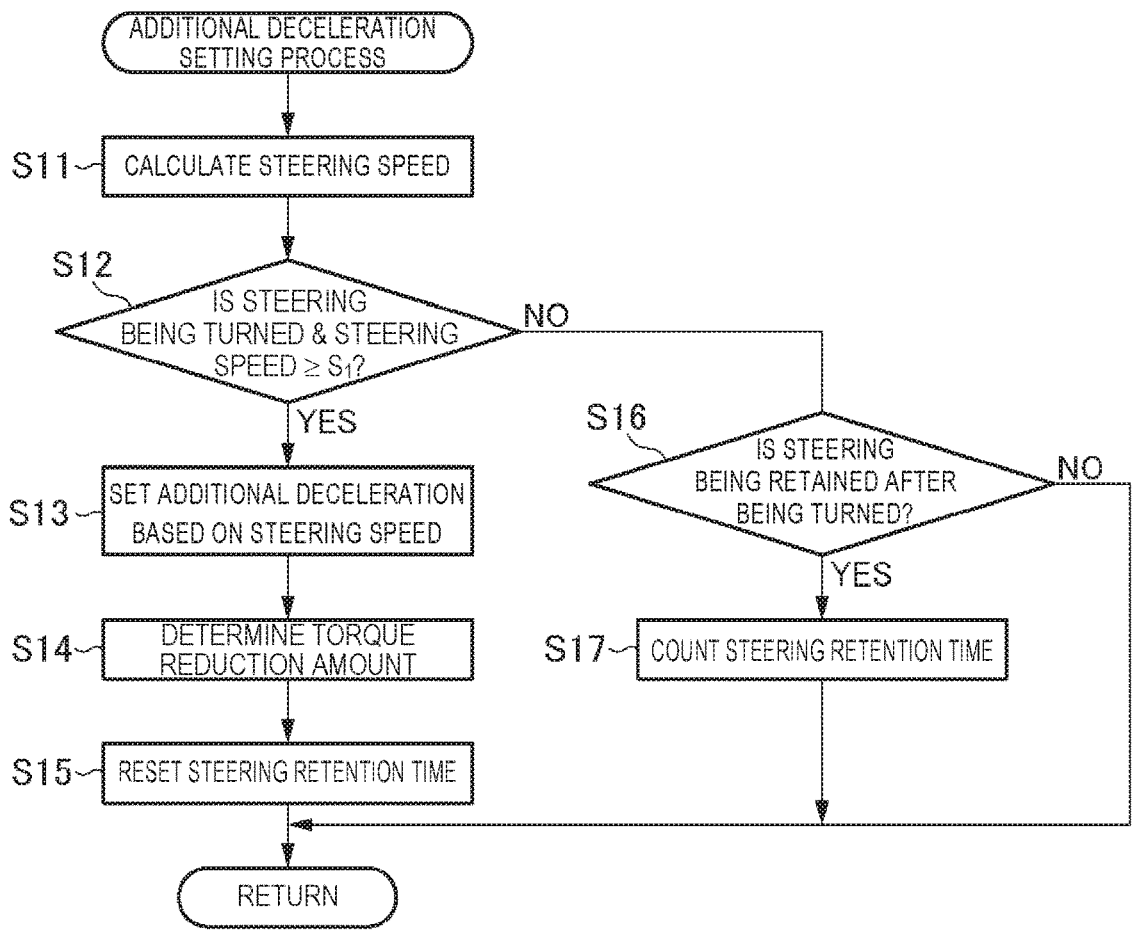
FIG. 4 is a flowchart of an additional deceleration setting process according to the embodiment of the present invention.
Figure 5:
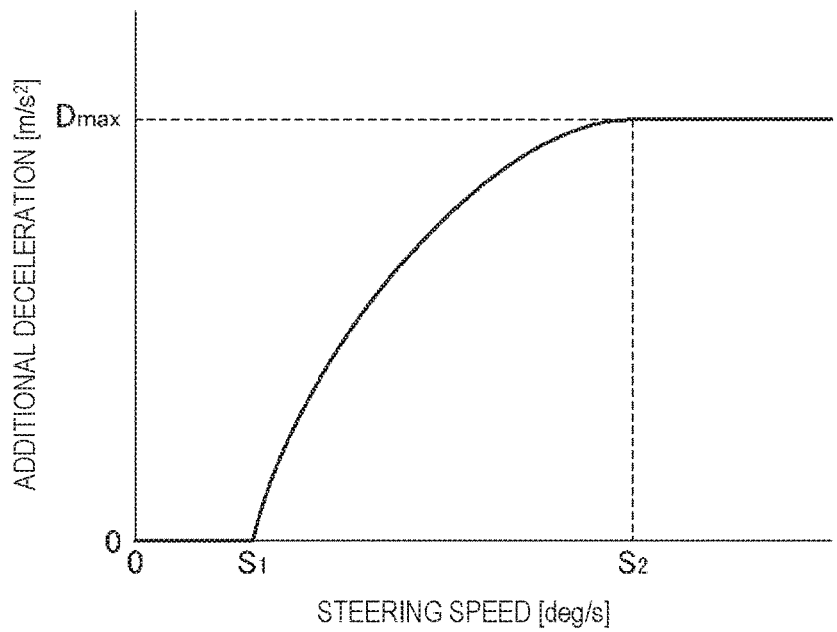
FIG. 5 is a map showing the relationship between the additional deceleration and steering speed according to the embodiment of the present invention.

Next, the additional deceleration setting process according to the embodiment of the present invention will be explained using FIG. 4 and FIG. 5. FIG. 4 is a flowchart of the additional deceleration setting process according to the embodiment of the present invention, and FIG. 5 is a map showing the relationship between the additional deceleration and the steering speed according to the embodiment of the present invention.

As shown in FIG. 4, when the additional deceleration setting process is started, the PCM 14 calculates, in step S11, the steering speed, based on the steering angle acquired in step S1 of the vehicle control process of FIG. 3.

Next, in step S12, the PCM 14 determines whether the steering wheel 6 is being turned (that is, the steering angle (absolute value) is increasing) and the steering speed is equal to or higher than a predetermined threshold value $S_1$.

As a result, when the steering wheel 6 is being turned and the steering speed is equal to or higher than the threshold value $S_1$, the PCM 14 proceeds to step S13 and sets an additional deceleration based on the steering speed. This additional deceleration is a deceleration to be applied to the vehicle 1 in response to the steering operation in order to accurately realize a vehicle behavior intended by the driver.

Specifically, the PCM 14 sets an additional deceleration corresponding to the steering speed calculated in step S11, based on the relationship between the steering speed and the additional deceleration shown in the map of FIG. 5.

The horizontal axis in FIG. 5 represents the steering speed, and the vertical axis represents the additional deceleration. As shown in FIG. 5, when the steering speed is less than the threshold value $S_1$, the corresponding additional deceleration is 0. In short, when the steering speed is lower than the threshold value $S_1$, the PCM 14 does not perform the control for applying the deceleration to the vehicle 1 (specifically, a reduction of the output torque of the engine 4), based on the steering operation.

On the other hand, when the steering speed is equal to or higher than the threshold value $S_1$, the additional deceleration corresponding to the steering speed asymptotically approaches a predetermined upper limit value $D_{max}$ as the steering speed increases. In short, as the steering speed increases, the additional deceleration increases and the increase ratio of the increase decreases. This upper limit value $D_{max}$ is set to such a deceleration (for example, 0.5 m/s² ≅ 0.05 G) that the driver does not sense a control intervention even when the deceleration is applied to the vehicle 1 in response to the steering operation.

Further, when the steering speed is equal to or higher than a threshold value $S_2$ that is larger than the threshold value $S_1$, the additional deceleration is maintained at the upper limit value $D_{max}$.

Next, in step S14, the PCM 14 determines a torque reduction amount, based on the additional deceleration set in step S13. Specifically, the PCM 14 determines a torque reduction amount required for realizing the additional deceleration by the reduction of the output torque of the engine 4, based on the vehicle speed acquired in step S1 of the vehicle control process of FIG. 3, the gear stage, the road surface slope, etc. at the present time.

Next, in step S15, the PCM 14 resets the time during which the steering wheel 6 is retained between the end of the vehicle attitude control following the completion of a turning operation of the steering wheel 6 and the start of the vehicle yaw control following the start of a returning operation of the steering wheel 6 (hereinafter, this time is referred to as the "steering retention time" as appropriate). This steering retention time is a value counted in step S17 described later. After step S15, the PCM 14 ends the additional deceleration setting process and returns to the main routine.

In step S12, when the steering wheel 6 is not being turned (that is, when the steering angle is constant or decreasing) or when the steering speed is lower than the threshold value $S_1$, the PCM 14 proceeds to step S16 and determines whether or not the steering wheel 6 is in a retained state after completion of the vehicle attitude control following the completion of the turning operation of the steering wheel 6 until the vehicle yaw control is started following the start of the returning operation of the steering wheel 6 (hereinafter, such a state is referred to as "being retained after being turned" as appropriate). Specifically, when the current steering angle is within a predetermined angle range (for example, within ±5°) from the steering angle when it was last determined in step S12 that the steering wheel 6 was being turned and the steering speed was equal to or higher than the threshold value $S_1$, the PCM 14 determines that steering is being retained after being turned.

As a result, when steering as being retained after being turned, the PCM 14 proceeds to step S17 and counts the elapsed time (steering retained time) from the end of the vehicle attitude control following the completion of the turning operation of the steering wheel 6 to the start of the vehicle yaw control following the start of the returning operation of the steering wheel 6. After step S17, the PCM 14 ends the additional deceleration setting process and returns to the main routine.

In step S16, when steering is not being retained after being turned (that is, when the steering wheel 6 is being returned or the steering wheel 6 is being retained at near neutral position), the PCM 14 ends the additional deceleration setting process and returns to the main routine.

The PCM 14 reduces the torque equivalent to the torque reduction amount set in step S14 of the additional deceleration setting process from the output torque of the engine 4 in step S4 of the vehicle control process of FIG. 3. Thus, when the turning operation of the steering wheel 6 is performed, the vertical load on the front wheels 2 is increased by reducing the output torque of the engine 4 based on the steering speed, and thereby the behavior of the vehicle 1 can be controlled with good responsiveness to the turning operation performed by the driver.

Next, the target yaw moment setting process according to the embodiment of the present invention will be explained using FIG. 6 to FIG. 8.

Figure 6:
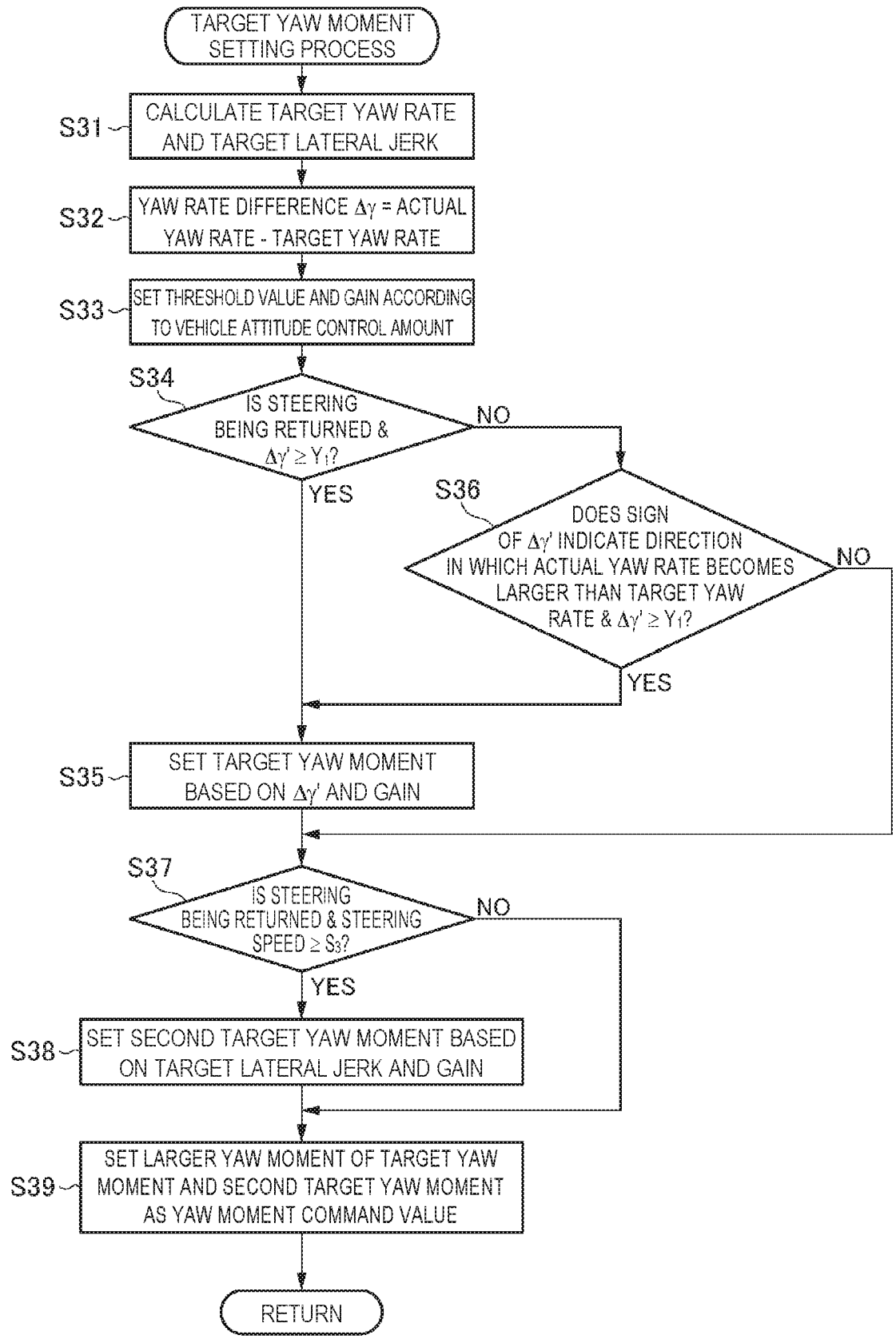
FIG. 6 is a flowchart of a target yaw moment setting process according to the embodiment of the present invention.
Figure 7:
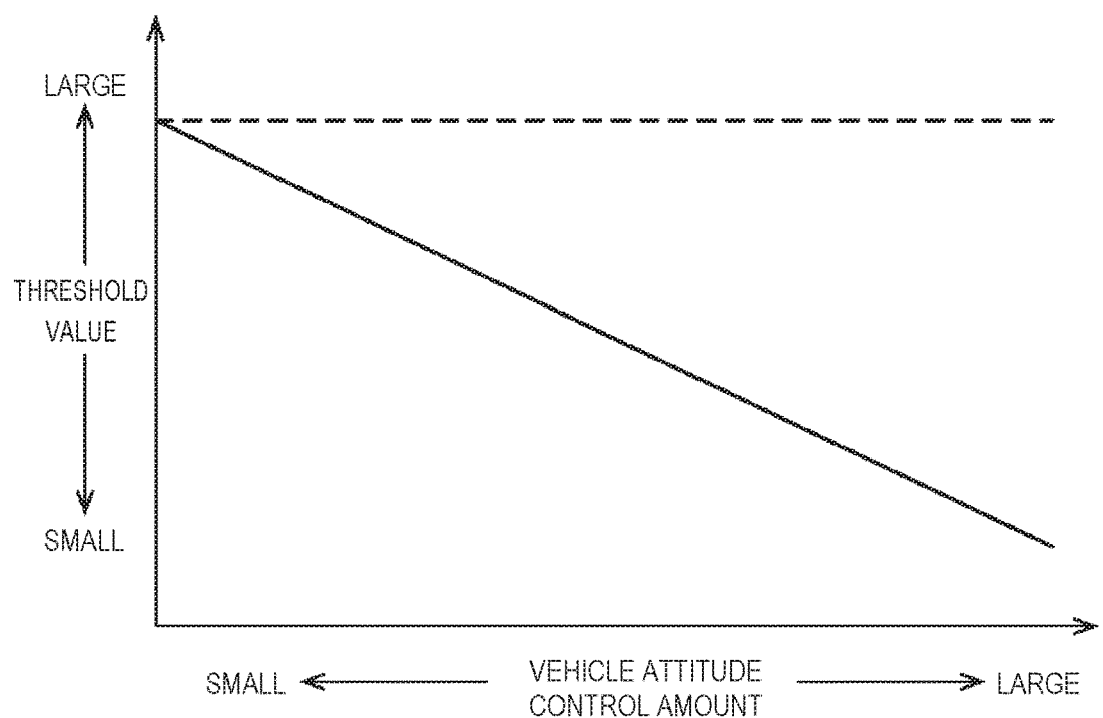
FIG. 7 is a map showing the threshold value used in the target yaw moment setting process according to the embodiment of the present invention.
Figure 8:
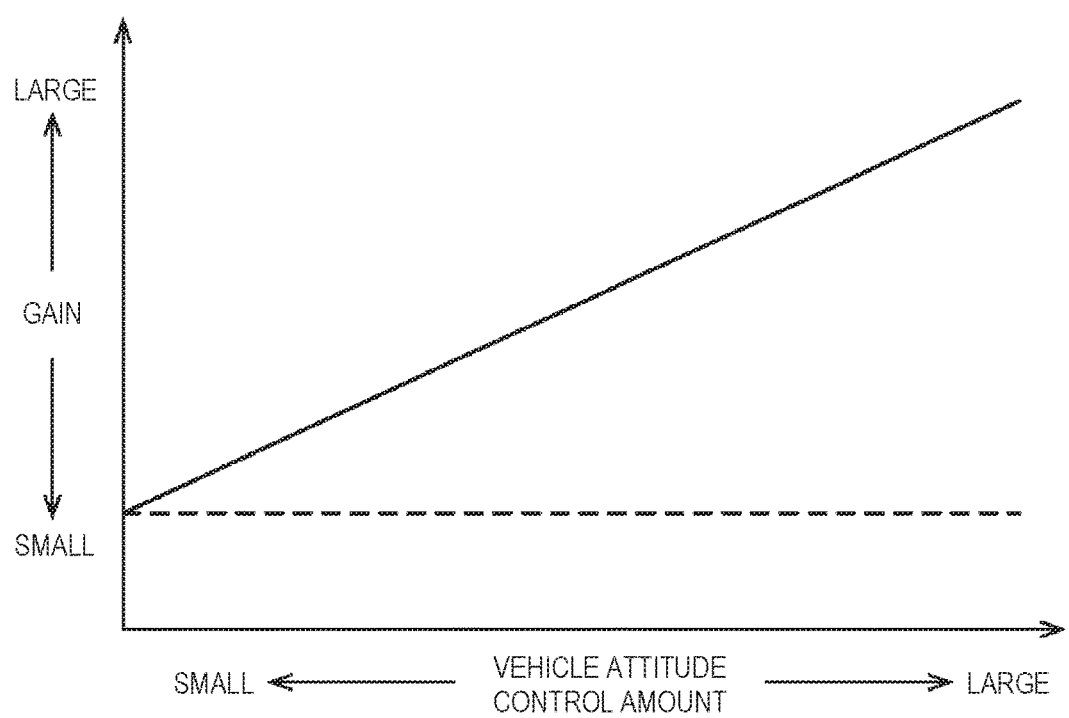
FIG. 8 is a map showing the gain used in the target yaw moment setting process according to the embodiment of the present invention.

FIG. 6 is a flowchart of the target yaw moment setting process according to the embodiment of the present invention, FIG. 7 is a map showing the threshold value used in the target yaw moment setting process according to the embodiment of the present invention, and FIG. 8 is a map showing the gain used in the target yaw moment setting process according to the embodiment of the present invention.

As shown in FIG. 6, when the target yaw moment setting process is started, the PCM 14 calculates, step S31, a target yaw rate and a target lateral jerk, based on the steering angle and vehicle speed acquired in step S1 of the vehicle control process of FIG. 3. Specifically, the PCM 14 calculates the target yaw rate by multiplying the steering angle by a coefficient corresponding to the vehicle speed. The PCM 14 also calculates the target lateral jerk, based on the steering speed and the vehicle speed.

Next, in step S32, the PCM 14 calculates the difference (yaw rate difference) $\Delta\gamma$ between the yaw rate (actual yaw rate) detected by the yaw rate sensor 12 acquired in step S1 of the vehicle control process of FIG. 3 and the target yaw rate calculated in step S31.

Next, in step S33, the PCN 14 sets threshold values $Y_1$ and $S_3$, which are used in the following determination process, according to the control amount (vehicle attitude control amount) of the vehicle attitude control executed before executing the vehicle yaw control based on the target yaw moment set in the current target yaw moment setting process, and also sets a gain which is used for setting the target yaw moment in the following process.

First, the setting of the threshold values $Y_1$ and $S_3$ will be specifically described with reference to FIG. 7. These threshold values $Y_1$ and $S_3$ are used for different determinations in later-described step S34 (including S36) and step S37, but basically, when a predetermined parameter corresponding to the returning operation of the steering wheel 6 is equal to or larger than the threshold values $Y_1$ and $S_3$, the threshold values $Y_1$ and $S_3$ are used for setting a target yaw moment to be applied to the vehicle 1 (that is, when the predetermined parameter is less than the threshold values $Y_1$ and $S_3$, a target yaw moment is not set). In the description of FIG. 7, the "threshold value $Y_1$" and "threshold value $S_3$" may be simply referred to as the "threshold value".

FIG. 7 is a map defining the threshold value that is used for setting the target yaw moment in the embodiment of the present invention. This map is produced in advance and stored in the memory or the like. In FIG. 7 the horizontal axis represents the vehicle attitude control amount, and the vertical axis represents the threshold value.

The vehicle attitude control amount includes at least any one of the additional deceleration set in step S13 of the additional deceleration setting process of FIG. 4, the torque reduction amount (driving force reduction amount) determined in step S14, the reducing speed when reducing the output torque of the engine 4 based on the torque reduction amount (driving force reducing speed), and the sum of torque reduction amounts. The additional deceleration is stored in the memory or the like when the PCM 14 sets the additional deceleration in step S13 of the additional deceleration setting process of FIG. 4. The torque reduction amount is stored in the memory or the like when the PCM 14 determines the torque reduction amount in step S14 of the additional reduction amount setting process of FIG. 4. Regarding the output torque reducing speed, when the PCM 14 determines the torque reduction amount in step S14 of the additional deceleration setting process of FIG. 4, the difference from the torque reduction amount determined in the previous additional deceleration setting process is calculated by the PCM 14, and the calculated value is stored as the output torque reducing speed in the memory or the like. Regarding the sum of torque reduction amounts, during the period from when the torque reduction amount is first determined in step S14 after starting the steering turning operation to when the torque reduction amount is last determined in step S14 after the completion of the steering turning operation, the sum of torque reduction amounts added each time the PCM 14 determines the torque reduction amount in step S14 is stored in the memory or the like.

In FIG. 7, the solid line indicates the threshold value when the tame (steering retention time) from the end of the vehicle attitude control following the completion of the turning operation of the steering wheel 6 to the start of the vehicle yaw control following the start of the returning operation of the steering wheel 6 is equal to or less than a predetermined time (for example, 2 seconds), and the broken line indicates the threshold value when the steering retention time is longer than the predetermined time. As shown by the solid line in FIG. 7 the map is defined so that when the steering retention time is equal to or less than the predetermined time, the threshold values are smaller, specifically both the threshold value $Y_1$ and the threshold value $S_3$ are smaller as the vehicle attitude control amount is larger.

By using such threshold values, when the vehicle attitude control amount is larger, the condition that predetermined parameters corresponding to a returning operation of the steering wheel 6 (in other words, predetermined parameters corresponding to the turning state of the vehicle 1) are equal to or larger than the threshold values is easily established. As a result, there is a higher possibility that the target yaw moment is set in the following process. Specifically, when the vehicle attitude control amount for reducing the driving force of the vehicle 1 based on a steering turning operation is larger, thereafter the control (vehicle yaw control) for applying to the vehicle 1 a yaw moment in the direction opposite to the actual yaw rate by the brake apparatus 16 is facilitated, in other words, the vehicle yaw control is easily executed. Thus, when the control amount of the vehicle attitude control is larger, it is possible to appropriately reduce a sense of discomfort felt by the driver by not executing the vehicle yaw control after executing the vehicle attitude control.

On the other hand, by using the threshold values as described above, when the vehicle attitude control amount is smaller, the condition that the predetermined parameters corresponding to the returning operation of the steering wheel 6 are equal to or larger than the threshold values is hard to be established. As a result, the possibility that the target yaw moment is set in the following process decreases. In short, when the vehicle attitude control amount is small, the vehicle yaw control is reduced, in other words, the vehicle yaw control is hard to be executed. Thus, it is possible to appropriately reduce the sense of discomfort felt by the driver due to execution of the vehicle yaw control when the control amount of the vehicle attitude control is small.

In contrast, as shown in the broken line in FIG. 7, when the steering retention time is longer than the predetermined time, the threshold value is constant at the value of when the vehicle attitude control amount is minimum (specifically, when the vehicle attitude control is not executed). It is considered that when the steering retention time is longer than the predetermined time, the influence of the vehicle attitude control is sufficiently small when starting the vehicle yaw control, and that the necessity of adjusting the ease of executing the vehicle yaw control according to the control amount of the vehicle attitude control is low.

FIG. 7 schematically shows the tendency of both the threshold values $Y_1$ and $S_3$ corresponding to the vehicle attitude control amount, and, following such a tendency, each of the threshold values $Y_1$ and $S_3$ is actually set individually according to the vehicle attitude control amount. Specifically, for each of the threshold value $Y_1$ and the threshold value $S_3$ which are used for the different determinations in step S34 (including S36) and step S37, a map corresponding to the vehicle attitude control amount is defined, and, in principle, the threshold value $Y_1$ and the threshold value $S_3$ are set to different values. For these threshold values $Y_1$ and $S_3$, by performing simulations or experiments in advance, values corresponding to the characteristics of the vehicle 1 to which the vehicle yaw control is applied are set by matching (the same applies to the gain to be described later).

Next, referring to FIG. 8, the gain that is used for setting the target yaw moment in the embodiment of the present invention will be specifically explained. FIG. 8 is a map that defines the gain in the embodiment of the present invention. This map is produced in advance and stored in the memory or the like. In FIG. 8, the horizontal axis represents the vehicle attitude control amount, and the vertical axis represents the gain. This gain is set to a value from 0 to 1 ($0 \leq \text{gain} \leq 1$) according to the vehicle attitude control amount, and is used to multiply the target yaw moment calculated by a later-described method. In short, a value obtained by multiplying the gain that is a value from 0 to 1 is used as the target yaw moment to be finally applied.

In FIG. 8, similarly to FIG. 7, the solid line indicates the gain when the steering retention time is equal to or less than a predetermined time (for example, 2 seconds), and the broken line indicates the gain when the steering retention time is longer than the predetermined time. As shown by the solid line in FIG. 8, the map is defined so that when the steering retention time is equal to or less than the predetermined time, the gain is larger when the vehicle attitude control amount is larger. With such a gain, when the vehicle attitude control amount is larger, the target yaw moment is larger. As a result, when the vehicle attitude control amount is large, thereafter the control amount is larger when executing the control (vehicle yaw control) that applies to the vehicle 1 a yaw moment in the direction opposite to the actual yaw rate by the brake apparatus 16. Consequently, it is possible to achieve an appropriate balance between the control amount of the vehicle attitude control and the control amount of the vehicle yaw control, and it is possible to prevent the driver from feeling a sense of discomfort as if there is inconsistency in control interventions.

On the other hand, when the vehicle attitude control amount is smaller, the target yaw moment is smaller. As a result, when the vehicle attitude control amount is smaller, the control amount of the vehicle yaw control to be executed thereafter is smaller. Thus, it is also possible to achieve an appropriate balance between the control amount of the vehicle attitude control and the control amount of the vehicle yaw control, and it is possible to prevent the driver from feeling a sense of discomfort as if there is inconsistency in control interventions.

In contrast, as shown by the broken line in FIG. 8, when the steering retention time is longer than the predetermined time, the gain is constant at the value of when the vehicle attitude control amount is minimum (specifically, when the vehicle attitude control is not executed). It is considered that when the steering retention time is longer than the predetermined time, the influence of the vehicle attitude control is sufficiently small when starting the vehicle yaw control, and that the necessity of adjusting the control amount of the vehicle yaw control according to the control amount, of the vehicle attitude control is low.

In the following process, although the target yaw moments are set separately in different steps S35, S38, gains having different values may be used when setting the target yaw moments in these different steps S35, S38. In this case, basically, the gains may also be increased when the vehicle attitude control amount is larger.

Returning to FIG. 6, the explanation of the process after step S34 will be resumed. In step S34, be PCM 14 determines whether the steering wheel 6 is being returned (that is, the steering angle is decreasing) and a changing speed $\Delta\gamma'$ of the yaw rate difference obtained by time differentiating the yaw rate difference $\Delta\gamma$ is equal to or more than the threshold value $Y_1$. As the threshold value $Y_1$, the PPM 14 uses the value set in step S33.

As a result, when the steering wheel 6 is being returned and the changing speed $\Delta\gamma'$ of the yaw rate difference is equal to or more than the threshold value $Y_1$, the PPM 14 proceeds to step S35 and sets a yaw moment in the direction opposite to the actual yaw rate of the vehicle 1 as the target yaw moment, based on the changing speed $\Delta\gamma'$ of the yaw rate difference and the gain set in step S33. Specifically, the PPM 14 calculates the magnitude of the target yaw moment as a criterion by multiplying the changing speed $\Delta\gamma'$ of the yaw rate difference by a predetermined coefficient, and calculates the magnitude of the target yaw moment to be applied to the vehicle 1 by further multiplying the criterion target yaw moment by the gain.

On the other hand, in step S34, when the steering wheel 6 is not being returned (that is, when the steering angle is constant or increasing), the PPM 14 proceeds to step S36 and determines whether the changing speed $\Delta\gamma'$ of the yaw rate difference is in the direction of causing the actual yaw rate to exceed the target yaw rate (that is, in the direction of causing the behavior of the vehicle 1 to oversteer) and the changing speed $\Delta\gamma'$ of the yaw rate difference is equal to or more than the threshold value $Y_1$. Specifically, when the yaw rate difference is decreasing under a condition in which the target yaw rate is equal to or higher than the actual yaw rate, or when the yaw rate difference is increasing under a condition in which the target yaw rate is less than the actual yaw rate, the PCM 14 determines that the changing speed $\Delta\gamma'$ of the yaw rate difference is in the direction of causing the actual yaw rate to be higher than the target yaw rate.

As a result, when the changing speed $\Delta\gamma'$ of the yaw rate difference is in the direction of causing the actual yaw rate to be higher than the target yaw rate and the changing speed $\Delta\gamma'$ of the yaw rate difference is equal to or higher than the threshold value $Y_1$, the PCM 14 proceeds to step S35 and sets, in the same manner as above, a yaw moment in the direction opposite to the actual yaw rate of the vehicle 1, as the target yaw moment, based on the changing speed $\Delta\gamma'$ of the yaw rate difference and the gain set in step S33.

After step S35, or in step S36, when the changing speed $\Delta\gamma'$ of the yaw rate difference is not in the direction of causing the actual yaw rate to be higher than the target yaw rate or when the changing speed $\Delta\gamma'$ of the yaw rate difference is less than the threshold value $Y_1$, the PCM 14 proceeds to step S37 and determines whether the steering wheel 6 is being returned (that is, the steering angle is decreasing) and the steering speed is equal to or higher than the predetermined threshold value $S_3$. For this threshold value $S_3$, the PCM 14 uses the value set in step S33.

As a result, when the steering wheel 6 is being returned and the steering speed is equal to or higher than the threshold value $S_3$, the PCM 14 proceeds to step S38 and sets a yaw moment in the direction opposite to the actual yaw rate of the vehicle 1, as a second target yaw moment, based on the target lateral jerk calculated in step S31 and the gain set in step S33. Specifically, the PCM 14 calculates the magnitude of the second target yaw moment as a criterion by multiplying the target lateral jerk by a predetermined coefficient, and calculates the magnitude of the second target yaw moment to be applied to the vehicle 1 by further multiplying the criterion second target yaw moment by the gain.

After step S38, or in step S37, when the steering wheel 6 is not being returned (that is, when the steering angle is constant or increasing) or when the steering speed is lower than the threshold value $S_3$, the PCM 14 proceeds to step S39 and sets a larger yaw moment of the target yaw moment set in step S35 and the second target yaw moment set in step S38, as a yaw moment command value. When a target yaw moment is not set in both step S35 and step S38 (that is, when both the processes in step S35 and S38 are not executed), the PCM 14 does not set a yaw moment command value in step S39. After step S39, the PCM 14 ends the target yaw moment setting process and returns to the main routine.

As an example of a traveling scene in which the above-described vehicle control process, additional deceleration setting process and target yaw moment setting process are executed, it is possible to suppose a traveling scene in which the driver performs a turning operation of the steering wheel 6 in a state in which the vehicle 1 is moving straight, retains the steering wheel 6 for a while in a state in which the steering wheel 6 has been turned, and then performs a returning operation to move back into the state of moving straight. In such a traveling scene, first, the vehicle attitude control is executed in response to the turning operation of the steering wheel 6, and thereby the deceleration set in the additional deceleration setting process is applied to the vehicle 1. Next, in the steering retention state, the steering retention time is counted. Subsequently, by executing the vehicle yaw control in response to the returning operation of the steering wheel 6, the target yaw moment set in the target yaw moment setting process is applied to the vehicle 1. The magnitude of the yaw moment to be applied to the vehicle 1 by the vehicle yaw moment control is adjusted according to the control amount of the vehicle attitude control executed beforehand. In short, when the deceleration applied to the vehicle 1 by the vehicle attitude control is larger, the yaw moment to be applied to the vehicle 1 by the vehicle yaw control is larger. Thus, it is possible to prevent a lack of yaw moment from being applied to the vehicle 1 by the vehicle yaw control in the returning operation subsequent to the turning operation. Therefore, it is possible to prevent the driver from feeling a sense of discomfort as if there is inconsistency in control interventions in the vehicle attitude control and the vehicle yaw control that are successively executed when the vehicle 1 is turning.

<Functions and Effects>

Next, the functions and effects of the vehicle control apparatus according to the embodiment of the present invention will be described.

According to the present embodiment, when the control amount of the vehicle attitude control is large at time of execution of the vehicle yaw control after executing the vehicle attitude control that decreases the driving force of the vehicle 1 based on the steering turning operation, the PCM 14 increases the control amount of the vehicle yaw control, which applies to the vehicle 1 the yaw moment in the direction opposite to the actual yaw rate generated is the vehicle 1, compared to when the control amount of the vehicle attitude control is not large. When the vehicle attitude control amount is relatively large, the moment for causing the vehicle 1 to turn in the direction corresponding to the steering turning operation tends to be stronger. Therefore, if the control amount of the vehicle yaw control is constant regardless of the vehicle attitude control amount during the returning operation subsequent to the turning operation, the yaw moment applied in the direction corresponding to the steering returning operation is insufficient. According to the present invention, as described above, when the control amount of the vehicle attitude control is large, the control amount of the vehicle yaw control is increased compared to when the control amount of the vehicle attitude control is not large, and therefore it is possible to prevent the insufficient yaw moment from being applied to the vehicle 1 by the vehicle yaw control in the returning operation subsequent to the turning operation. Consequently, it is possible to achieve an appropriate balance between the control amount of the vehicle attitude control and the control amount of the vehicle yaw control, and it is possible to prevent the driver from feeling a sense of discomfort as if there is inconsistency in control interventions in the vehicle attitude control and the vehicle yaw control that are executed successively when the vehicle 1 is turning.

According to the present embodiment, the vehicle attitude control amount includes at least any one of the additional deceleration set in step 13 of the additional deceleration setting process of FIG. 4, the torque reduction amount (driving force reduction amount) determined in step S14, the reduction speed when reducing the output torque of the engine 4 based on the torque reduction amount (driving force reduction speed), and the sum of torque reduction amounts. Thus, the control amount of the vehicle attitude control can be appropriately taken into consideration.

Moreover, according to the present embodiment, when the control amount of the vehicle attitude control is large in a case where the steering retention time from the end of the vehicle attitude control to the start of the vehicle yaw control is less than or equal to the predetermined time, the PCM 14 increases the control amount of the vehicle yaw control compared to when the control amount of the vehicle attitude control is not large. Thus, when executing the vehicle yaw control in a situation in which the influence of the vehicle attitude control remains, the control amount of the vehicle yaw control is adjusted while considering the influence of the vehicle attitude control, and the sense of discomfort felt, by the driver due to the control can be reduced.

Furthermore, according to the present embodiment, the PCM 14 executes the vehicle yaw control when the value corresponding to the returning operation of the steering wheel 6 (the changing speed $\Delta\gamma'$ of the yaw rate difference or the steering speed) is equal to or larger than a predetermined threshold value (threshold value $Y_1$ or $S_3$), and, when the control amount of the vehicle attitude control is large at time of execution of the vehicle yaw control after executing the vehicle attitude control, the PCM 14 decreases the threshold value compared to when the control amount of the vehicle attitude control is not large. Therefore, when the control amount of the vehicle attitude control is large, by not executing the vehicle yaw control after executing the vehicle attitude control, it is possible to appropriately reduce the sense of discomfort felt by the driver.

According to the present embodiment, when the steering speed acquired based on the detected value from the steering angle sensor 8 is equal to or higher than the threshold value $S_3$, the PCM 14 sets a target lateral jerk based on the steering speed and the vehicle speed, and sets a yaw moment to be applied to the vehicle yaw control based on the target lateral jerk. Consequently, it is possible to apply the yaw moment of magnitude corresponding to the speed of the steering operation performed by the driver in the direction of restricting the turning of the vehicle 1, and it is possible to quickly stabilize the vehicle behavior in response to the steering operation performed by the driver.

According to the present embodiment, when the changing speed of the difference between the actual yaw rate actually generated in the vehicle 1 and the target yaw rate set based on the detected value from the steering angle sensor 8 is equal to or higher than the threshold $Y_1$, the PCM 14 sets a yaw moment to be applied to the vehicle yaw control based on the changing speed. Thus, for example, when the steering wheel 6 is operated on a low μ road such as a compressed snow road, the yaw moment in the direction of restricting the turning can be immediately applied to the vehicle 1 in response to a sudden change in the yaw rate difference caused by a delay in the response of the actual yaw moment, and the vehicle behavior can be quickly stabilized in response to the steering operation performed by the driver, before the behavior of the vehicle 1 becomes unstable.

<Modifications>

Next, modifications of the present embodiment (synonymous with other embodiments) will be described. A plurality of modifications shown below can be appropriately combined with each other and implemented.

(Modification 1)

In the above-described embodiment, the vehicle yaw control is reduced by changing both the threshold value for determining whether or not to execute the vehicle yaw control and the yaw moment that is applied by the vehicle yaw control (changed by a gain), whereas, in a modification, the vehicle yaw control may be reduced by changing only one of the threshold value and the yaw moment. Specifically, when the steering speed in the returning operation of the steering wheel 6 is low, the threshold value for determining whether or not to execute the vehicle yaw control may be increased, or the yaw moment to be added by the vehicle yaw control may be decreased. This also makes it possible to reduce the vehicle yaw control when the steering speed is relatively low.

(Modification 2)

In the above-described embodiment, when the vehicle attitude control amount is large in a case where the steering retention time is equal to or less than the predetermined time, the changing speed is made to decrease the threshold value for determining whether or not to execute vehicle yaw control and increase the yaw moment to be applied by the vehicle yaw control (the change made by a gain), whereas when the steering retention time is longer than the predetermined time, the threshold value and the yaw moment are made constant regardless of the vehicle attitude control amount. However, in a modification, for the same vehicle attitude control amount, when the steering retention time is short, the control amount of the vehicle yaw control may be increased and the threshold value may be decreased compared to when the steering retention time is not short. This also makes it possible to adjust the control amount of the vehicle yaw control while considering the influence of the vehicle attitude control, and to appropriately reduce the sense of discomfort felt by the driver due to the control.

(Modification 3)

In the above-described embodiment, both the setting of the target yaw moment based on the changing speed V of the yaw rate difference (step S35 in FIG. 6) and the setting of the target yaw moment based on the target lateral jerk (step S38 in FIG. 6) are executed, whereas, in a modification, only one of these two target yaw moment settings may be executed.

(Modification 4)

In the above-described embodiment, it is described that the PCM 14 generates a deceleration by reducing the driving force of the vehicle 1 with a reduction of the output torque of the engine 4, but the deceleration may be generated by reducing the driving force of the vehicle 1 with the reduction of the output torque of the engine 4 and/or a braking force of a regenerative brake caused by rotating an alternator or a motor generator to generate electricity, a braking force of an engine brake when an accelerator pedal is not pressed, which is generated by changing the gear ratio of an automatic transmission to the lower side (such as a downshift), a reduction of the vehicle driving force by reducing the degree of engagement of the clutch and brake in the automatic transmission (more slippage), rotational resistances of engine accessories driven by the engine 4, such as an air conditioner compressor 34.

(Modification 5)

In the above-described embodiment, there is shown an example in which the rotation angle of the steering column connected to the steering wheel 6 (the angle detected by the steering angle sensor 8) is used as the steering angle of the vehicle 1, whereas, in a modification, various state quantities in a steering system (the rotation angle of a motor that gives assist torque, a rack displacement in a rack and pinion, etc.) may be used as the steering angle of the vehicle 1, instead of the rotation angle of the steering column, or together with the rotation angle of the steering column.

REFERENCE SIGNS LIST

1 vehicle
front wheel
4 engine
6 steering wheel 8 steering angle sensor
10 vehicle speed sensor
12 yaw rate sensor
14 PCM
16 brake apparatus
18 brake control system

The invention claimed is:

1. A vehicle control apparatus having a steering apparatus, a driving force controller configured to control a driving force of a vehicle, a brake configured to apply different braking forces to left and right wheels, and a controller, the vehicle control apparatus being characterized in that the controller is configured to:
execute vehicle attitude control for controlling the driving force controller to reduce the driving force of the vehicle, based on a turning operation of the steering apparatus;
increase a control amount of the vehicle attitude control as a steering speed of the steering apparatus during the turning operation increases;
execute vehicle yaw control for controlling the brake to apply to the vehicle a yaw moment in a direction opposite to a yaw rate generated in the vehicle, based on a returning operation of the steering apparatus; and
at time of execution of the vehicle yaw control after executing the vehicle attitude control, increase a control amount of the vehicle yaw control as the control amount of the vehicle attitude control increases.

2. The vehicle control apparatus according to claim 1, wherein the control amount of the vehicle attitude control includes at least any one of a deceleration that is applied to the vehicle by a reduction of the driving force of the vehicle, a reduction amount of the driving force of the vehicle, a reducing speed of the driving force of the vehicle, and the sum of reduction amounts of the driving force of the vehicle.

3. The vehicle control apparatus according to claim 1, wherein the controller is configured to, in a case where a time from an end of the vehicle attitude control to a start of the vehicle yaw control is equal to or less than a predetermined time, increase the control amount of the vehicle yaw control as the control amount of the vehicle attitude control increases.

4. The vehicle control apparatus according to claim 2, wherein the controller is configured to, in a case where a time from an end of the vehicle attitude control to a start of the vehicle yaw control is equal to or less than a predetermined time, increase the control amount of the vehicle yaw control as the control amount of the vehicle attitude control increases.

5. The vehicle control apparatus according to claim 1, wherein the controller is configured to execute the vehicle yaw control when a value corresponding to a returning operation of the steering apparatus reaches or exceeds a predetermined threshold value, and, at time of execution of the vehicle yaw control after executing the vehicle attitude control, decrease the threshold value as the control amount of the vehicle attitude control increases.

6. The vehicle control apparatus according to claim 1, wherein the controller is configured to, when a steering speed of the steering apparatus reaches or exceeds a predetermined threshold value, set the yaw moment based on a target lateral jerk corresponding to the steering speed and a vehicle speed, and execute the vehicle yaw control to apply the yaw moment to the vehicle.

7. The vehicle control apparatus according to claim 2, wherein the controller is configured to, when a steering speed of the steering apparatus reaches or exceeds a predetermined threshold value, set the yaw moment based on a target lateral jerk corresponding to the steering speed and a vehicle speed, and execute the vehicle yaw control to apply the yaw moment to the vehicle.

8. The vehicle control apparatus according to claim 3, wherein the controller is configured to, when a steering speed of the steering apparatus reaches or exceeds a predetermined threshold value, set the yaw moment based on a target lateral jerk corresponding to the steering speed and a vehicle speed, and execute the vehicle yaw control to apply the yaw moment to the vehicle.

9. The vehicle control apparatus according to claim 4, wherein the controller is configured to, when a steering speed of the steering apparatus reaches or exceeds a predetermined threshold value, set the yaw moment based on a target lateral jerk corresponding to the steering speed and a vehicle speed, and execute the vehicle yaw control to apply the yaw moment to the vehicle.

10. The vehicle control apparatus according to claim 5, wherein the controller is configured to, when a steering speed of the steering apparatus reaches or exceeds a predetermined threshold value, set the yaw moment based on a target lateral jerk corresponding to the steering speed and a vehicle speed, and execute the vehicle yaw control to apply the yaw moment to the vehicle.

11. The vehicle control apparatus according to claim 1, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

12. The vehicle control apparatus according to claim 2, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

13. The vehicle control apparatus according to claim 3, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

14. The vehicle control apparatus according to claim 4, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

15. The vehicle control apparatus according to claim 5, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

16. The vehicle control apparatus according to claim 6, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

17. The vehicle control apparatus according to claim 7, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

18. The vehicle control apparatus according to claim 8, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

19. The vehicle control apparatus according to claim 9, wherein the controller is configured to, when a changing speed of a difference between a target yaw rate corresponding to a steering angle of the steering apparatus and a vehicle speed and an actual yaw rate actually generated in the vehicle reaches or exceeds a predetermined threshold value, set the yaw moment based on the changing speed, and execute the vehicle yaw control to apply the yaw moment to the vehicle.

20. A vehicle control apparatus having a steering apparatus, a driving force controller configured to control a driving force of a vehicle, a brake configured to apply different braking forces to left and right wheels, and a controller, the vehicle control apparatus being characterized in that the controller is configured to:
   execute vehicle attitude control for controlling the driving force controller to reduce the driving force of the vehicle, based on a turning operation of the steering apparatus;
   increase a control amount of the vehicle attitude control as a steering speed of the steering apparatus during the turning operation increases;
   when a value corresponding to a returning operation of the steering apparatus reaches or exceeds a predetermined threshold value, execute vehicle yaw control for controlling the brake to apply to the vehicle a yaw moment in a direction opposite to a yaw rate generated in the vehicle, based on the returning operation of the steering apparatus; and
   at time of execution of the vehicle yaw control after executing the vehicle attitude control, decrease the threshold value as the control amount of the vehicle attitude control increases.

* * * * *